United States Patent [19]

Vollet

[11] Patent Number: 5,364,308
[45] Date of Patent: Nov. 15, 1994

[54] TORSIONAL VIBRATION DAMPER

[75] Inventor: Eric M. Vollet, Netherthong, England

[73] Assignee: Holset Engineering Company, Ltd., Turnbridge, United Kingdom

[21] Appl. No.: 805,346

[22] Filed: Dec. 9, 1991

[30] Foreign Application Priority Data

Dec. 7, 1990 [GB] United Kingdom ............... 9026693

[51] Int. Cl.$^5$ ........................... F16D 3/12; F16D 3/50
[52] U.S. Cl. ........................................ 464/82; 464/24
[58] Field of Search ........................ 464/24, 27, 81, 82, 464/84

[56] References Cited

U.S. PATENT DOCUMENTS

| | | | |
|---|---|---|---|
| 1,595,763 | 8/1926 | Eaton | 464/82 |
| 2,266,872 | 12/1941 | Kuhns et al. | 464/82 |
| 3,729,953 | 5/1973 | Wanzer | 464/82 X |
| 3,996,767 | 12/1976 | Geislinger | 464/82 |
| 4,104,891 | 8/1978 | Geislinger | 464/82 X |
| 4,262,499 | 4/1981 | Pfeifer | 464/82 |

FOREIGN PATENT DOCUMENTS 3033302  4/1981  Germany .................. 464/82

*Primary Examiner*—Daniel P. Stodola
*Attorney, Agent, or Firm*—Gary M. Gron

[57] ABSTRACT

A torsional vibration damper of the type that incorporates a plurality of radially extending springs in chambers containing damping fluid. The springs flexibly connect an inner hub with an annular outer component comprised of two rings fastened in abutting relation. Opposed recesses in the rings form spring receiving chambers. The outer ends of the springs are clamped either by shims or spring seating wedges acting against the side walls of the recesses, thus eliminating the need for a peripheral clamping ring holding the springs in clamped relation.

11 Claims, 3 Drawing Sheets

U.S. Patent  Nov. 15, 1994  Sheet 1 of 3  5,364,308
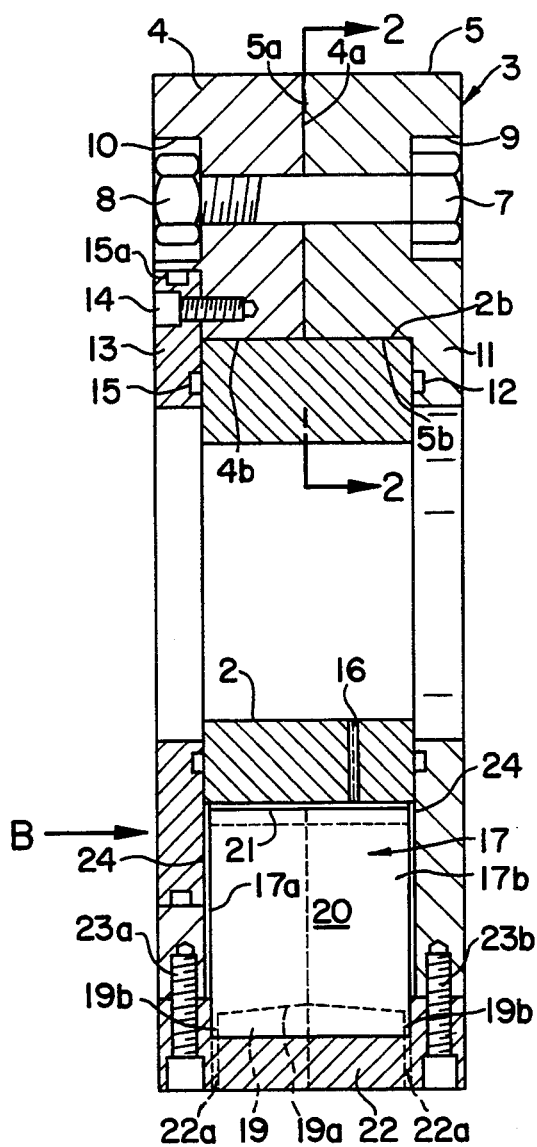
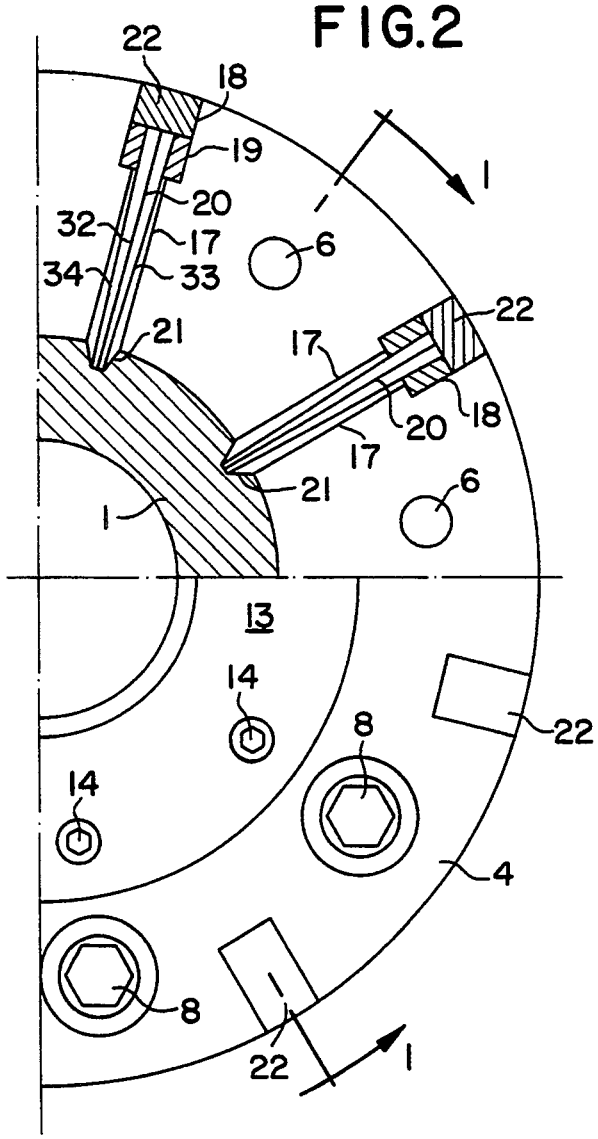
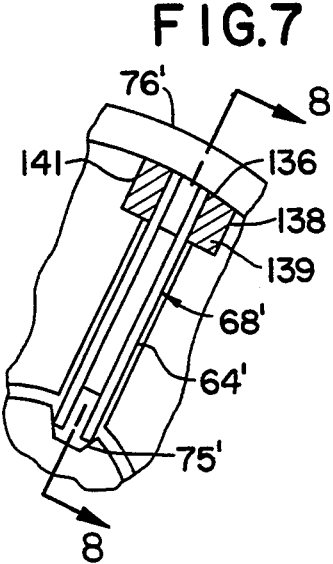
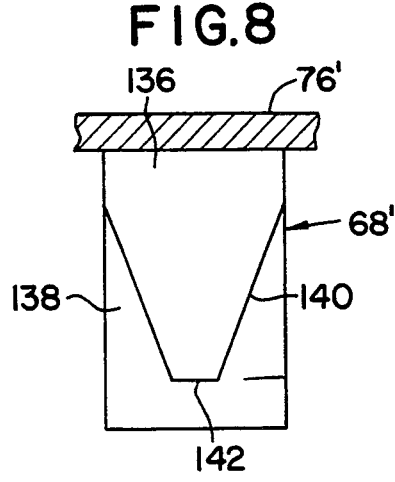

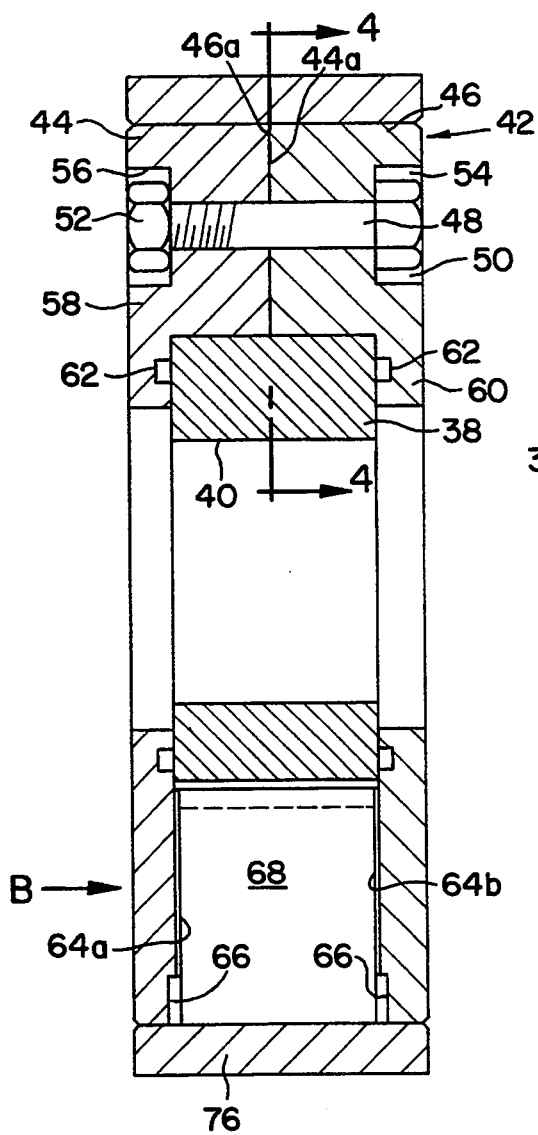
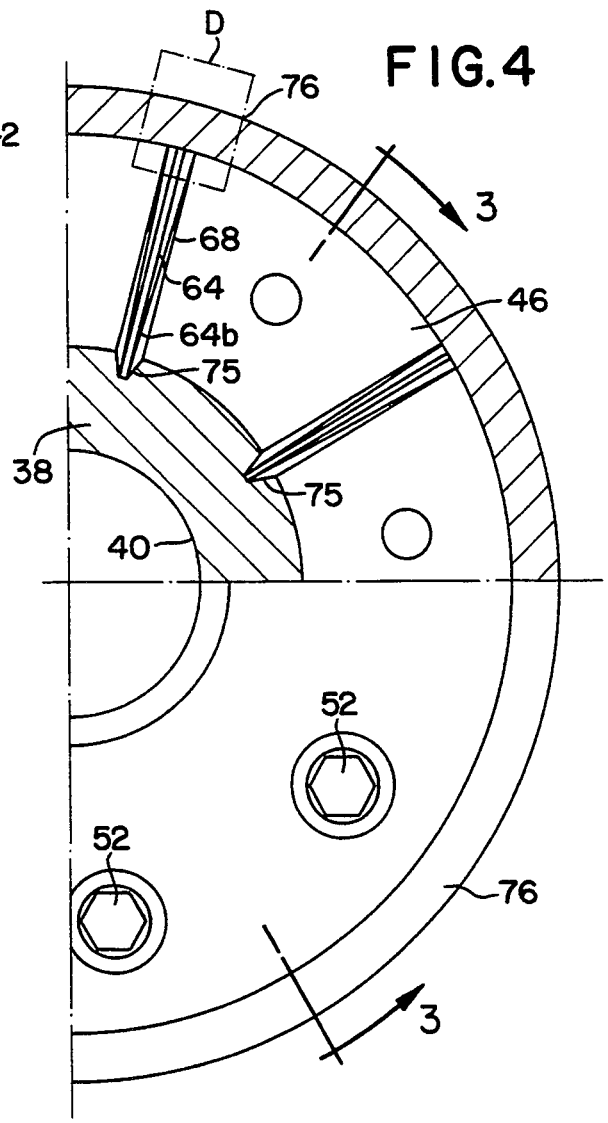
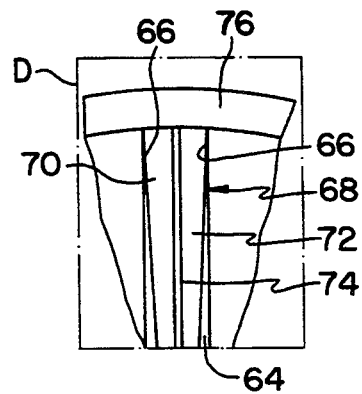

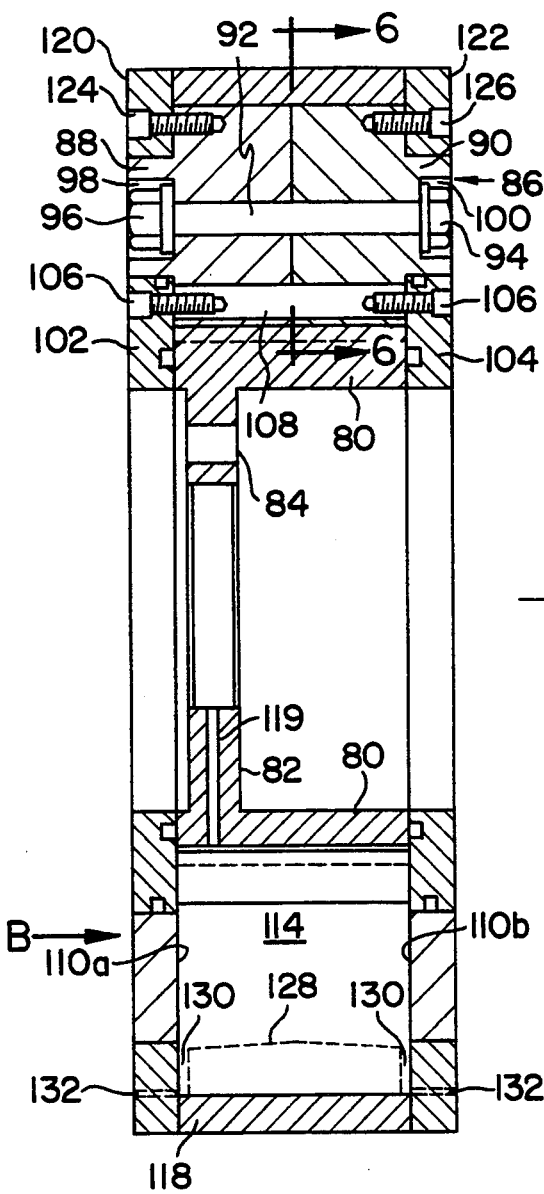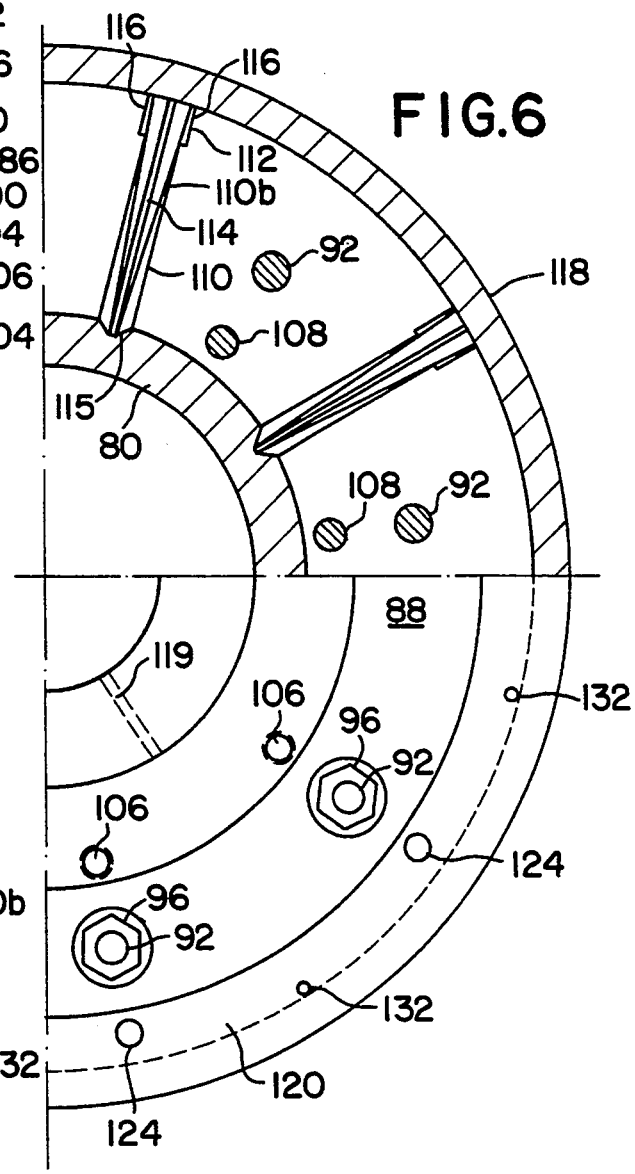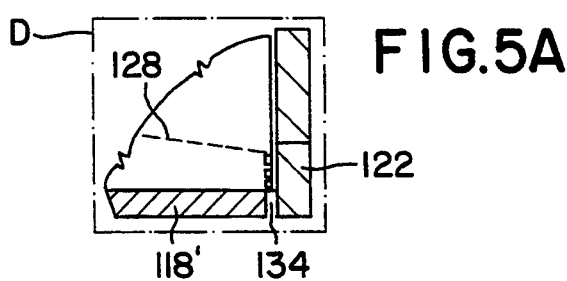

TORSIONAL VIBRATION DAMPER

TECHNICAL FIELD

This present invention relates to an improved torsional vibration damping mechanism for damping angular oscillation and/or to a coupling mechanism for transmitting torque.

BACKGROUND ART

There exists a class of torsional vibration dampers of the kind in which radially disposed springs in chambers containing damping fluid interconnect coaxial inner and outer components which are rotatable relative to one another to flex the springs and achieve a damping effect. An example of this type of damping is described in U.S. Pat. No. 3,996,767 to Geislinger. This device comprises a hub integral with an output/input shaft. The hub and a clamping ring define therebetween an annular damping chamber defined at one end face by a coupling flange and at the other end face by a cover plate. Angularly spaced groups of flexible leaf springs are arranged in this chamber and extend radially between the hub and the clamping ring which locks the leaf springs in position. The leaf springs are radially inwardly tapered and a plurality of intermediate wedge-shaped elements are arranged between respective groups of leaf springs. The leaf spring groups and the wedge-shaped elements are assembled by placing the clamping ring around them in tension.

This type of coupling is expensive because it requires complex assembly of many parts which must be premachined to high tolerances. In particular, the groups of springs, wedge-shaped elements and clamping ring must all be accurately positioned relative to each other and the central hub. This type of damper is assembled by placing the wedges, springs and necessary shims to form a ring and then placing an outer clamping ring over the assembly of individual parts. The clamping ring serves the purpose of clamping the outer ends of the springs so it must either be heat shrunk onto the periphery of the assembly or incorporate a design which allows it to be urged inwardly. Since there are a multiplicity of individual components, any inaccuracy will be magnified because of the stack-up of tolerances. As a result, the hoop stress of the clamping ring can rise to a level where cracking of the ring could occur.

It is an object of the present invention to obviate or mitigate the aforesaid disadvantage.

DISCLOSURE OF THE INVENTION

According to the present invention the above objects are achieved by a torsional vibration damping or coupling mechanism comprising an inner annular element and means forming an outer annular element divided radially into two mating rings with facing recesses together defining radial spring-receiving slots at the outer ends of which a plurality springs are clamped individually without recourse to a common clamping ring and extend radially inward to corresponding slots on the inner annular element.

The above and other related objects and features of the invention will be apparent from a reading of the following description of the disclosure and the novelty thereof pointed out in the appended claims.

In the drawings,

FIG. 1 is a cross section taken on line AA of FIG. 2 of a first embodiment of torsional vibration damper;

FIG. 2 in the upper part is a section on the line CC of FIG. 1 and in the lower part a side view in the direction of arrow B of FIG. 1;

FIG. 3 is a cross section taken on line AA of FIG. 4 of a second embodiment of a torsional vibration damper in accordance with the present invention;

FIG. 4 in the upper part is a section on line CC of FIG. 3 and in the lower part is a side view in the direction of arrow B of FIG. 3;

FIG. 4A is an enlarged partial view of FIG. 4 bounded by rectangle D.;

FIG. 5 is a cross section taken on line AA of FIG. 5 of a third embodiment of torsional vibration damper in accordance with the present invention.

FIG. 5A is an enlarged partial view of FIG. 5 bounded by rectangle D showing an alternative design of the indicated area;

FIG. 6 in the upper part is a section on line CC of FIG. 5 and in the lower part is a scale view in the direction of arrow B in FIG. 5;

FIG. 7 is a partial cross-section view of a torsional vibration damper with an alternative embodiment of springs for the damper; and FIG. 8 is a cross-section taken on lines AA of FIG. 7.

BEST MODE FOR CARRYING OUT THE INVENTION

Referring now to FIGS. 1 and 2, a first embodiment of a torsional vibration damper comprises an annular hub 1 fixed to a shaft (not shown) received in a bore 2. The hub 1 is encircled by an annular outer component 3 comprising two rings 4, 5 held in mating contact by bolts 6 with heads 7 and extending through equi-angularly spaced holes into engagement with hexagonal nuts 8, the bolt heads 7 and the nuts 8 being located in recesses 9, 10 of the rings 5, 4, respectively. The exposed side of the ring 5 projects radially inwardly as an integral flange 11 over end face 1a of the hub 1 and a seal 12 such as an elastomeric o-ring is provided between the flange 11 and the hub 1. At the opposite end face 1b of the hub 1 the function of the flange 11 is served by a removable annular side plate 13 held in position against end face 1b by equi-angularly spaced screws 14. A seal 15 is provided between the side plate 13 and the hub 1 and a further seal 15a is provided between the side plate 13 and the ring 4. Seals 15, 15a may be formed from elastomeric o-rings.

The hub 1 has a plurality of radial bores 16 for transmitting engine lubricating oil serving as a damping fluid from a central reservoir (not shown) to spring chambers 17 in the annular component 3. Each spring chamber 17 initially comprises a substantially parallel-sided uniform cross-section slot defined partly by a radially extending recess 17a formed in the face 4a of ring 4 and partly by a corresponding radially extending recess 17b in the confronting face 5a of the ring 5. When the two opposed rings 4 and 5 have been assembled to cause end faces 4a and 5a to abut as illustrated in FIG. 1, the spring chambers 17 are enlarged at their radially outer end and extended axially over the full width of the annular component 3 to form enlarged slots 18. Preferably slots 18 are formed by milling in an axial direction across the rings 4 and 5. By milling slots 18 after rings 4 and 5 are in their assembled position, the accuracy of the slots 18 is greatly enhanced.

Each slot 18 receives a pair of spring seating wedges 19 for seating a spring 20 having a thickness which tapers radially inwardly and has its inner end located in a corresponding outer facing slot 21 in the hub 1. Each spring 20 may comprise a single leaf or consist of a pack of two or more leaves separated by shims. Illustrated are springs comprising a pair of leaves 32 and 33 separated by a shim 34. Shim 34 may be formed from material with inherent lubricity and is provided to reduce fretting and wear on the opposing faces of the springs during flexing. In addition, shim 34 may be sized to eliminate backlash between the inner portion of spring 20 and corresponding slot 21. The springs 20 are retained in slots 18 by retaining clamps 22 attached by screws 23a and 23b to the annular periphery of rings 4 and 5, respectively.

Assembly is carried out by fitting one or more shims (not shown) as needed between the spring seating wedges 19 and the enlarged slot 18 sides 18a, 18b to accurately position the radially inner ends of the springs 20 in the hub pockets 21. The shims are sized such that when the springs 17 are driven radially inwards, the taper on their outer faces produces a tight compression fit of the springs 20, spring seating wedges 19 and shims in the slots 18. The small angle of this taper, usually together with the lateral location provided at the spring seats by the clamps 22 gives improved control of the spring position during fitting thus allowing each spring pair to be assembled individually. This makes assembly much easier than the complex simultaneous assembly of prior art designs discussed above which use a common clamping ring for driving the springs into their seats. Because the clamping force for the outer ends of the springs 20 is provided by the structure making up the opposed rings 4 and 5, there is no need for a peripheral clamping ring that has a critical limit on its hoop stress.

In operation, relative rotation displacement between the annular component 3 and the hub 1 causes flexing of the springs 20 in their chambers 17. As a result, damping fluid flows through clearances 24 between the long edges of the springs 20 and the adjacent walls of the chambers 17 to achieve the desired damping effect.

Alternatively, controlled clearances may be provided between the inner diameters 4b, 5b of rings 4, 5, respectively, and the outer diameter 2b of hub 2 so as to permit flow of damping fluid between adjacent spring chambers 17. For the damper shown in FIG. 2, the flow would be from the side of spring chamber 17 (at the one o'clock position) to the right of the spring 20 that chamber to the side of spring chamber 17 (at the two o'clock position) to the left side of the spring in that chamber.

The radially inner surfaces of the spring seating wedges 19 are convexly curved at 19a (FIG. 1) in order to direct radially outwardly flowing damping fluid towards the side walls of the chambers 17, past gaps 19b at the ends of the wedges 19 and then through small outlet openings 22a to the exterior of the damper. The passages 16 are provided to direct a flow of fluid through the damper that cools it. In the case of an internal combustion engine, lubricating oil which is cooled and filtered is used as the fluid. The convex curvature of the seating wedges 19 is provided to insure that no dead spaces exist in the damper where sediment entrained in the fluid may collect.

The damper of FIGS. 1 and 2 can be employed in a wide variety of sizes to fit different engine applications, although it is preferable that it be employed for larger size dampers. The embodiments shown in FIGS. 3–6 show dampers that retain common features and benefits but have enhanced suitability for smaller sized dampers.

Referring now to the second embodiment illustrated in FIGS. 3 and 4 the torsional vibration damper comprises an annular hub 38 having a bore 40 which receives a shaft (not shown) whose torsional vibrations are to be damped. The hub 38 is encircled by an annular outer component 42 comprising two rings 44, 46 held in mating contact by bolts 48 with heads 50 and extending through equi-angularly spaced holes into engagement with hexagonal nuts 52, the bolt heads 50 and the nuts 52 being located in recesses 54, 56 of the rings 46, 44, respectively. Both rings 44 and 46 have integral, inwardly extending flanges 58, 60, respectively, that embrace opposite end faces of hub 40. Suitable seals 62, such as elastomeric o-rings, prevent loss of fluid from chambers internal to the torsional vibration damper.

As is the case with the torsional vibration damper of FIGS. 1 and 2, spring chambers 64 each comprise a generally parallel-sided uniform cross-section slot defined partly by a radially extending recess 64a in the face 44a of ring 44 and a corresponding radially extending recess 64b in the face 46a of ring 46.

However, spring seats 66 are form milled into radially outer ends of the slots 64 as shown in FIG. 4a. The spring seats 66 clamp the outer ends of springs 68 which may be in unitary form or comprise a pair of leafs 70, 72 separated by a shim 74. The radially inner ends of springs 68 are received in corresponding outer facing slots 75 in hub 38. In this embodiment the springs 68 are held in compression between the spring seats 66 through the use of suitable shims, when necessary. This allows the elimination of the wedges 19 and permits all the springs 68 to be retained by a single outer ring 76. It should be noted that ring 76 serves merely to retain and cover the outer ends of springs 68. It is not required to provide the clamping forces for the springs through hoop stresses as in prior art devices.

The embodiment of FIGS. 3–4a is intended to be used in situations/applications where the damping/coupling mechanism is pre-filled with damping fluid and sealed and no provision is made for a continuous throughflow of damping fluid.

In the embodiment of FIGS. 5 and 6 a torsional vibration damper comprises an annular hub 80 having an integral inwardly directed flange 82 and holes 84, only one of which is shown, by which the hub 80 may be mounted to a shaft (not shown). The hub 80 is encircled by an annular outer component 86 comprising two rings 88, 90 held in mating contact by bolts 92 with heads 94 and extending through equi-angularly spaced holes into engagement with hexagonal nuts 96, the bolt heads 94 and the nuts 96 being located in recesses 100, 98 of the rings 90, 88 respectively. The rings 88, 90 are maintained on hub 80 by removable annular side plates 102, 104, respectively by means of screws 106 threaded into the ends of dowels 108 extending through the rings 88, 90.

As is the case with previous embodiments, a plurality of spring chambers 110 is provided. Each spring chamber 110 comprises a radially extending generally parallel-sided uniform cross-section slot defined partly by a radially extending recess 110a in the face 88a of ring 88 and a corresponding radially extending recess 110b in the face 90a of ring 90. However, axially extending tapered spring seats 112 are formed at the radially outer end of each spring chamber 110, thereby dispensing with wedges. The spring seats 112 may be formed by milling an axially extending groove on the periphery of the rings 88, 90 after they are mated together. Springs 114 are held in compression between the tapered spring seats 112 by suitable shims 116. The radially inner ends of springs 114 are received in wedge shaped axially extending grooves 115 in the annular hub 80. Assembly is carried out by fitting appropriate shims 116 between the tapered side faces of the springs 114 and the tapered side faces of the spring seats 112. The shims are sized to produce a tight compression fit of the springs in the spring seats. This permits elimination of the wedges and allows all the springs 114 to be held by a single retaining ring 118 as in the second embodiment.

It should be noted that ring 118 serves merely to retain and cover the outer ends of springs 114. It is not required to provide the clamping forces for holding the springs 114 through hoop stresses as in prior art devices.

Annular side plates 120, 122 are provided on end faces of the rings 88, 90 respectively so as to close the spring chambers 110 and ring 118 laterally. The rings 120, 122 are held in position by respective screws 124, 126. The inner edges 128 of the shims 116 are formed convexly to direct damping fluid to gaps 130 formed by sizing the axial length of the shims to be slightly less than the dimension of the springs 114 in the axially extending direction. The damping fluid flows from the spring chamber 110, through gaps 130 to lateral openings 132 thereby keeping the spring chambers free of sediment. As an alternative to the lateral openings 130 the annular ring 118 may have a similar axial length to the shims 116 thereby providing radial outlets 134 for the damping fluid (see FIG. 5a). In either case, radial passages 119 in flange 82 provide a source of damping fluid to spring chambers 110.

The springs illustrated for use in the torsional vibration dampers of FIGS. 1–6 incorporate leaves with a thickness which tapers from their radially outer end. Such leaves may be expensive and difficult to manufacture. If it is necessary to utilize non-tapered leaves, the spring embodiment of FIGS. 7 and 8 may be employed. This embodiment is shown in connection with the damper shown in FIGS. 4, but may be employed on any of the other dampers described herein. In FIG. 7, the spring chambers 64' have positioned in them springs 68' each comprised of flat, substantially constant thickness leaves 136, 138. An enlarged, axially directed, slot 139 is formed at the radially outer end of spring chamber 64'. A pair of blocks 141 of appropriate size are positioned on opposite sides of spring 68' within slot 139 so that spring 68' is clamped or held by the walls of slot 139. Leaves 138 are rectangular in plain view as shown in FIG. 8 while leaves 136 have the same width but incorporate a tapered section 140 terminating at an inner end 142 short of the length of the rectangular leaves 138. A typical spring pack may include two each of leaves 136 and 138, with leaves 136 being in the center. The advantage of stacking leaves in this configuration is that for a given level of stiffness the stress on individual springs is reduced. Since the inner ends of leaves 138 are bent slightly into grooves 75', any slack between the hub and outer component is taken up. The taper on the leaves may be such that the inner edge 142 is one-fourth of the width of leaf 136 and the taper begins at a point L/4 where L is equal to the distance from the point at which the taper begins to the inner edge of leaf 138. The leaf 136 terminates at a distance L/4 from the inner edge of leaf 136.

Although the above description has related to torsional vibration dampers it will be appreciated that like constructions may be used in torque transmitting coupling mechanisms. In the damping mechanism a shaft, e.g., a crankshaft, is connected at one end to the hub. In the case of a coupling mechanism the outer component usually is flange connected to a shaft to or from which the drive is transmitted through the mechanism by an input/output shaft fixed to the hub.

The throughflow feature for keeping the assembly free from sediment (see FIGS. 1 and 2 and FIGS. 5 and 6) has been described in the context of the novel torsional vibration damping or coupling mechanism in accordance with the present invention. However, it will be appreciated that this feature may usefully be incorporated in alternative designs, for example in the Geislinger mechanism described in U.S. Pat. No. 3,996,767.

Having thus described the invention, what is claimed and desired to be secured by Letters Patent of the United States is:

1. A torsional vibration damper comprising:
   an inner annular element;
   a pair of outer annular rings encircling said inner annular element;
   means for fastening said outer annular rings in abutting relationship, said rings having generally radially extending recesses cooperating to form a plurality of chambers;
   spring means for damping torsional vibration received in each chamber and having a radially inner end connected to said inner annular element;
   clamping means at the radially outer end of said spring means for clamping the spring means to the outer annular rings with the walls of said chamber in which said spring means is received;
   the radially outer portion of said outer annular rings having axially extending enlarged slots intersecting each of said chambers at the radially outer portion thereof; and,
   retaining means comprising a retaining clamp extending through each said enlarged slot and secured to said rings for retaining said spring means in place.

2. Apparatus as in claim 1 wherein said clamping means comprises:
   a pair of wedge-shaped elements positioned between the outer portions of said spring means and the walls of the radially outer portion of said chambers.

3. Apparatus as in claim 2 wherein:
   said spring means has a tapered cross section,
   said enlarged slots are rectangular in cross section, said wedge-shaped elements being positioned in said enlarged slots, each of said slots having a taper which generally conforms to the taper of said spring means at the outer portion thereof for clamping said spring means.

4. Apparatus as in claim 3 further comprising shims positioned along with the spring means and wedge elements in between the walls of said enlarged slots so as to maintain sufficient clamping force to hold the spring means in place.

5. Apparatus as in claim 1 wherein the damper contains damping fluid in said chamber and the spring means has a controlled clearance relative to the walls of said chamber thereby providing damping as the fluid passes around the spring means.

6. Apparatus as in claim 1 wherein the damper contains damping fluid in said chamber and a controlled clearance is provided between the inner annular element and the encircling rings thereby providing damping as fluid passes between adjacent chambers.

7. Apparatus as in claim 1 wherein at least the radially outer portion of said spring means has a tapered cross section and the radially outer portion of each said chamber has opposed walls generally conforming to the taper of said spring means, said walls being spaced from one another sufficiently to thereby form said clamping means for clamping the radially outer portion of said spring means between the walls of said chamber.

8. Apparatus as in claim 7 further comprising shims positioned along with the radially outer portion of said spring means in between the tapered walls of said chamber to maintain sufficient clamping force to hold the spring means in place.

9. A torsional vibration damper comprising;
an inner annular element;
a pair of outer annular rings encircling said inner annular element;
means for fastening said outer annular rings in abutting relationship, said rings having generally radially extending recesses cooperating to form a plurality of chambers;
spring means for damping torsional vibration received in each chamber and having a radially inner end connected to said inner annular element;
means at the radially outer end of said spring means for clamping the spring means to the outer annular rings through the walls of said chamber in which said spring means is received;
inner passageway means formed in said inner annular element for directing a source of damping fluid to said chambers;
outer passageway means formed at the periphery of said rings for connecting the chambers to the exterior of said damper; and
means for forming angled surfaces in said chamber for directing flow of damping fluid toward said outer passageway means thereby minimizing the buildup of sediment in said chambers.

10. Apparatus as in claim 9 wherein said outer passageway means comprise passageways extending radially outward from the spring chambers.

11. Apparatus as in claim 9 wherein said outer passageway means comprise passageways extending axially from the radially outer portion of said spring chamber.

* * * * *